May 22, 1956     G. I. BOTTCHER     2,746,787
SCRAP CHARGING BUCKET

Filed Nov. 9, 1951     5 Sheets—Sheet 1

INVENTOR.
George I. Bottcher

BY
HIS ATTORNEYS

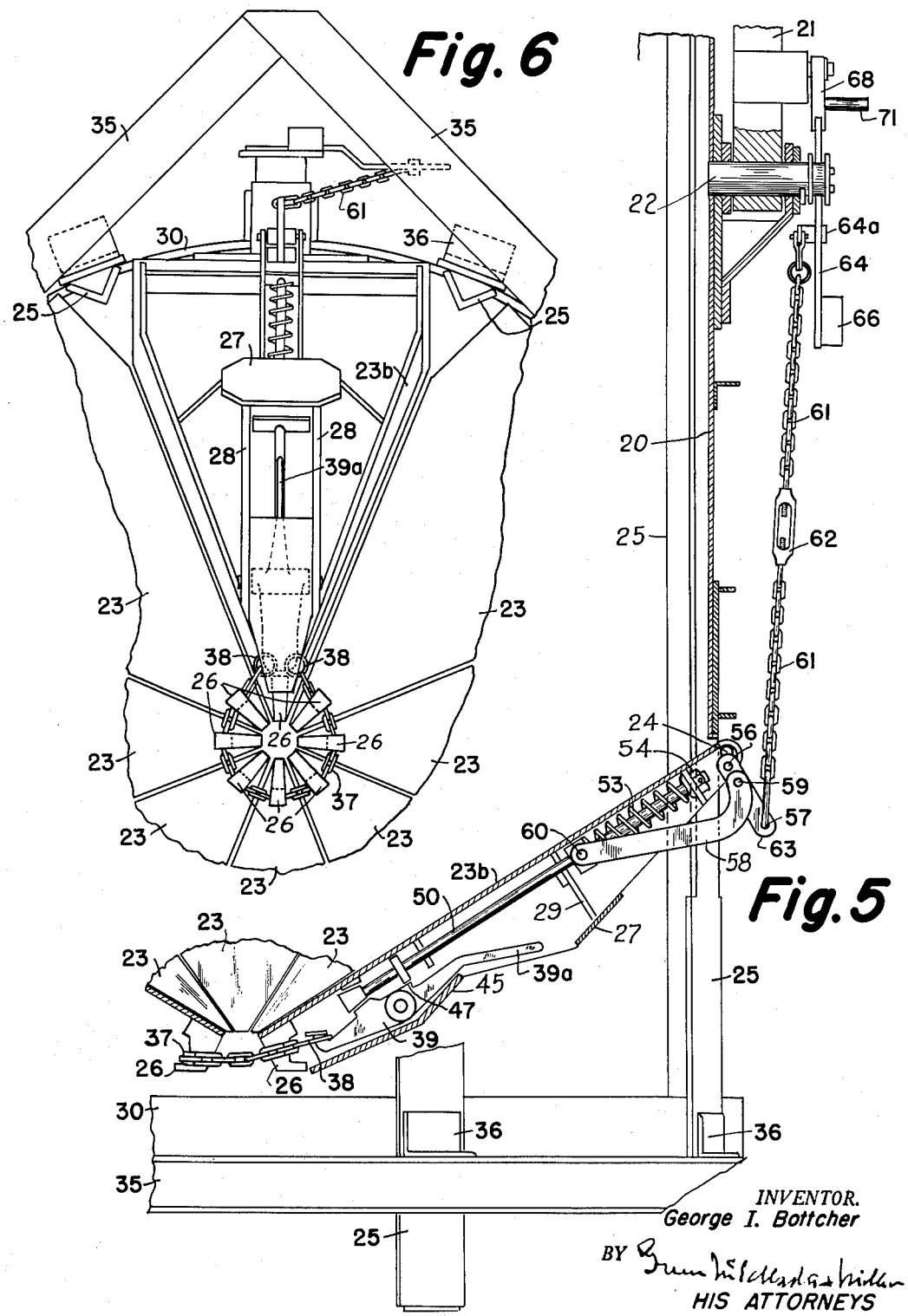

May 22, 1956  G. I. BOTTCHER  2,746,787
SCRAP CHARGING BUCKET
Filed Nov. 9, 1951  5 Sheets-Sheet 3

INVENTOR.
George I. Bottcher
BY
HIS ATTORNEYS

INVENTOR.
George I. Bottcher
BY
HIS ATTORNEYS

May 22, 1956 G. I. BOTTCHER 2,746,787
SCRAP CHARGING BUCKET
Filed Nov. 9, 1951 5 Sheets-Sheet 5

INVENTOR.
George I. Bottcher
BY
HIS ATTORNEYS

United States Patent Office 2,746,787
Patented May 22, 1956

2,746,787

SCRAP CHARGING BUCKET

George I. Bottcher, Tarentum, Pa., assignor to Allegheny Ludlum Steel Corporation, Brackenridge, Pa., a corporation of Pennsylvania Application November 9, 1951, Serial No. 255,663

12 Claims. (Cl. 294—71)

This invention relates to furnace charging devices and more particularly to buckets for charging scrap metal through an opening in the top of a furnace such as an electric furnace of the arc or induction type.

Scrap charging buckets of the type here contemplated usually have a scrap capacity of from about 80,000 to 90,000 pounds. These buckets are usually either cylindrical or octagonal in cross section and are provided with a bottom made up of downwardly extending tapered leaves which are pivotally connected to the bucket body adjacent its lower edge and in the case of octagonal buckets, eight such leaves are employed. Each of these leaves at its lower narrow end is provided with an outwardly extending hook-like finger.

Buckets of this type are provided with a series of spaced downwardly extending column-like support legs which are adapted to support the bucket a sufficient distance above a supporting platform, such as the platform of a car, in order to allow the bottom leaves to clear such platform when the same are down or in open position.

In order to close the bottom of the bucket, that is, to move the leaves (in this case eight) to closed position, a stand having a tubular top ring is provided. This stand may either rest on the ground or on a carriage or car platform. This stand has column-like legs of such length that when the bucket by means of an overhead crane is lowered onto such stand, the tubular top ring of such stand contacting with cam pads on the outer side of such leaves move or swing the leaves to closed position.

Heretofore when a bucket of the type here contemplated was to be filled with scrap metal, it was first lowered onto such closing stand and a rope of sufficient length was wound around the depending hook-like fingers of the leaves and the bottom of the bucket was thus secured in closed position.

After the bucket was filled with scrap, it was either moved to position on the floor near the furnace to be charged or was supported on a car or carriage by which it could be moved to position near such furnace.

When the furnace was ready to be charged, the bucket of scrap was raised and supported by a crane above the charging opening in the top or roof of the furnace. If the furnace was operating, the rope was either set afire by a torch or burned until severed by the heat of the furnace rising through such opening. When the rope was burned through and thus severed, the bottom leaves would swing down and the charge deposited through the charging opening.

After the bucket was discharged, it was either carried by the overhead crane to the loading point or by such crane was lowered to a waiting carriage or car and by such car moved to the scrap loading area.

A scrap charging bucket of the type here contemplated is usually provided with a bail which is pivotally connected to trunnions projecting outwardly from opposite sides of the bucket body. Such buckets may have a diameter in excess of ten feet so that the rope to be burned through by the flame of the blow torch is located possibly four feet or more from the outer edge of the bucket. The operation of releasing the bottom leaves of the bucket in order to deposit the scrap load has been more or less dangerous and at best has been uncertain and relatively slow, and an object of this invention is to provide means whereby the bottom leaves of such bucket may be reliably locked in closed position and quickly unlocked or released from locked position.

These and other objects I attain by means of the device described in the specification and illustrated in the drawings accompanying and forming part of this application.

In the drawings:

Fig. 5 is a fragmental view partially in section and partially in elevation showing the locking device in the locking position shown in Fig. 4;

Fig 6 is a bottom plan view of the mechanism disclosed in Fig. 5;

Figure 11:
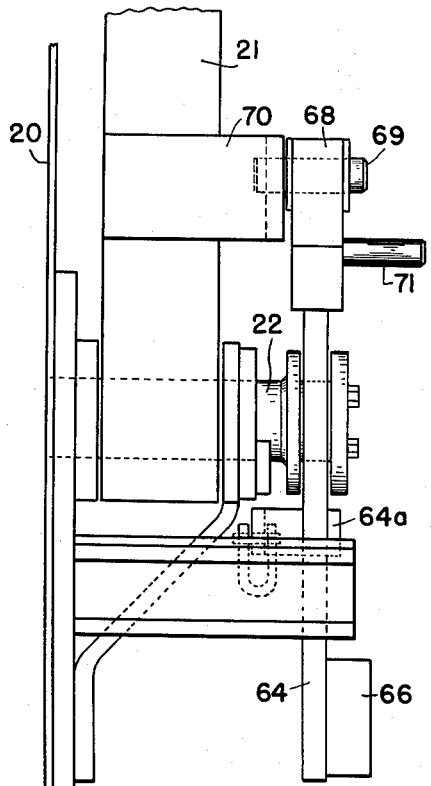
Fig. 11 is an elevational view looking toward the left side of Fig. 10.
Figure 13:
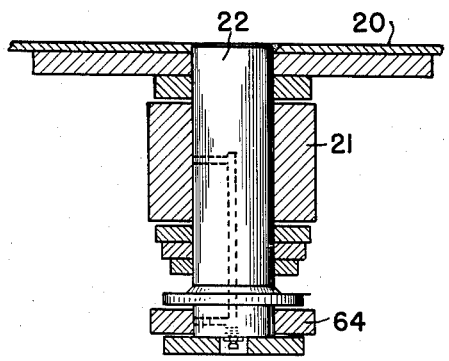
Fig. 13 is a sectional view taken on line XIII—XIII of Fig. 10.
Figure 12:
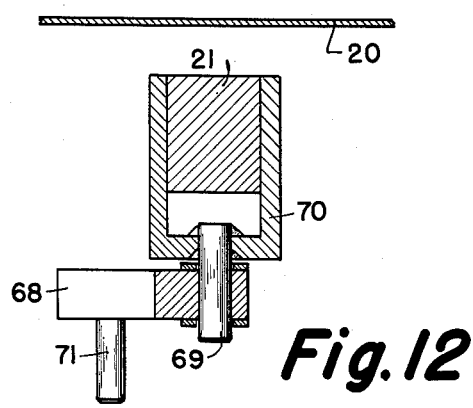
Fig. 12 is a sectional view taken on line XII—XII of Fig. 10.
Figure 16:
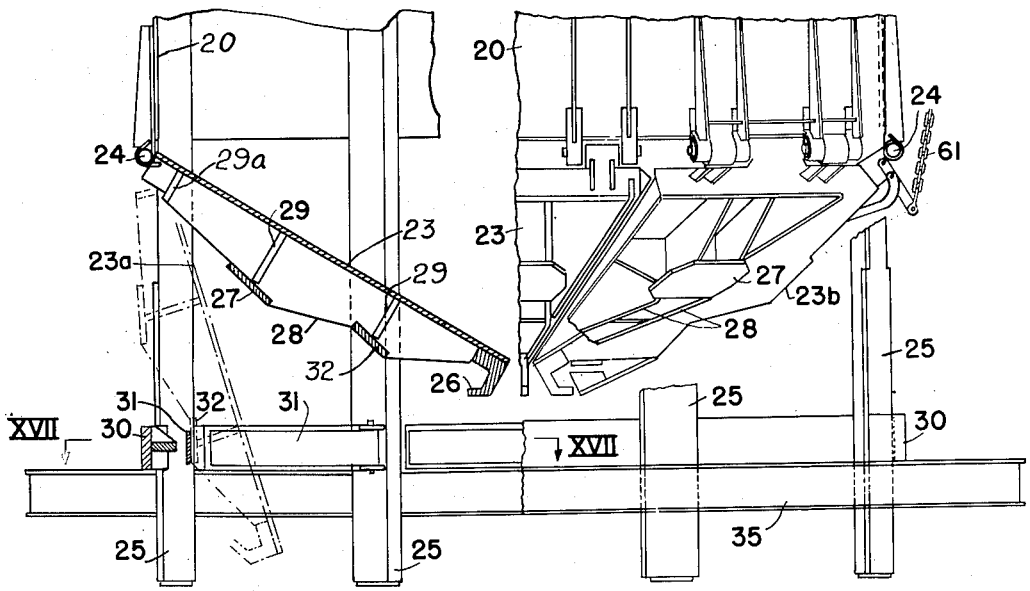
Fig. 16 is a fragmentary view partially in section and partially in elevation and shows the bottom portion of the bucket body, some of the bottom leaves in elevation and one in section as they appear after being moved to closed position by the closing frame heretofore referred to, and a fragment of which is illustrated in Fig. 18.

In the embodiment of my invention herein disclosed, the scrap charging bucket comprises a bucket body 20 having a bail 21 pivotally connected to trunnions, one of which is shown in Figs. 11 and 13 and is numbered 22. Downwardly tapered leaves 23 constitute the bottom of the bucket and these are pivotally connected to the body at its lower edge as indicated at 24 in Figures 1, 2, 5, 16 and 18. The bucket is provided with a series of post-like legs 25 (Figures 1, 5, 6, 16 and 18) which were heretofore used for supporting the bucket on a support such as a car or platform when the bucket was empty, either with its bottom open or closed, also when the bucket was loaded with scrap.

Heretofore these buckets were supported and suspended by an overhead crane throughout the entire discharging operation even during burning of the rope in order to release the bottom leaves and dump the scrap load.

Each of the leaves 23 is provided with a hook-like projection 26 at its lower end and with at least one plate-like member 27 which serves as a cam pad and is carried by the stiffening ribs 28 and 29.

A ring or hoop-like member 30 encircles the series of post-like legs 25 and carries a series (in this case eight) of spring members 31 which serve as buffers for the eight leaves forming the bucket bottom when such leaves are swung downwardly violently, as happens when the bucket is being discharged; the scrap load, when the rope encircling the hook-like projections 26, is burned through, may tend to violently force the leaves outwardly while passing from the bucket into the furnace.

Pads 32 are so positioned on stiffening ribs 28 and 29 that they contact springs 31 when the leaves drop or are forced to open position. This is depicted at the left-hand side of Figure 16 by a dot and dash line leaf 23a.

Figure 18:
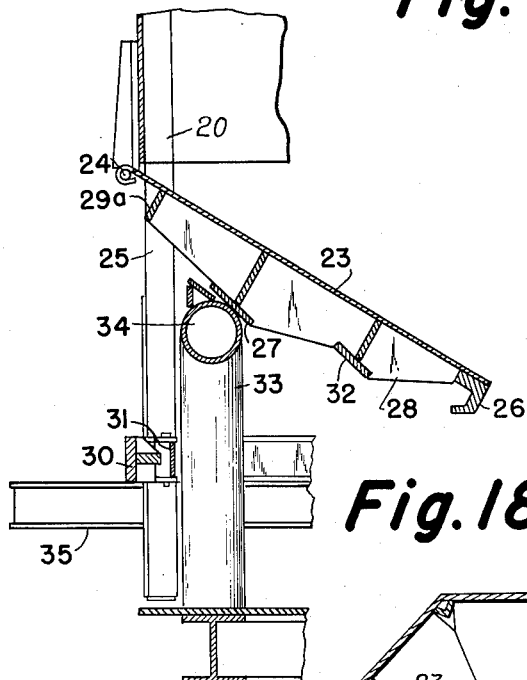
Fig. 18 is a schematic view showing part of the bottom closing frame, one of the support legs of the bucket and the spring guard of Fig. 17, and depicts the operation of the closing frame.
Figure 17:
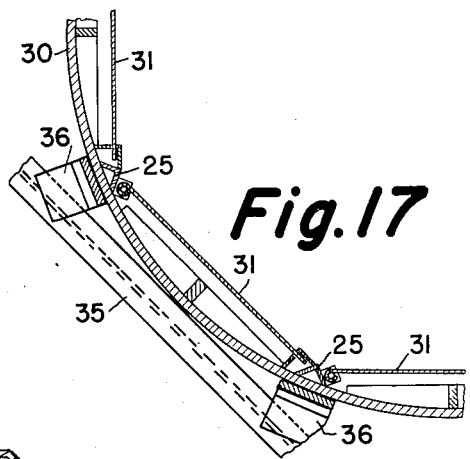
Fig. 17 is a sectional view taken on line XVII—XVII of Fig. 16.
Figure 19:
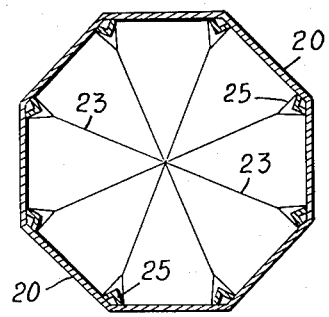
Fig. 19 is a sectional view taken on line XIX—XIX of Fig. 1.

In Figure 18, 33 represents one of the legs of a closing stand used in closing the bottom leaves of the bucket. This stand, aside from a series of support legs 33, includes an upper tubular ring 34. The diameter of this tubular ring is such with relation to the bucket size that the lower ends of the stiffening ribs 28 of the bottom leaves 23, when such leaves are in down position (as shown by the dot and dash line leaf 23a in Figure 16) will enter such ring during lowering of the bucket onto the stand by an overhead crane, and will contact the inner surface of such tubular ring. This ring will then in effect ride up the outer edge faces of stiffening ribs 28 so that when cam pad 27 contacts tubular ring 34, the leaves will be in closed position as shown in full lines in Figure 16.

In order to support the bucket on the rim of the furnace charging opening for the purpose of discharging its load, I provide a rectangular frame 35 which is secured, preferably by welding, to the underside of brackets 36 carried by ring or hoop-like member 30 opposite post-like legs 25 which are preferably formed from rolled equal angled sections and extend to the top of the bucket.

In place of the rope heretofore used for securing the bottom leaves 23 of the bucket in closed position, I provide a metal chain 37 which has rings 38 at its opposite ends and which midway between its ends is secured, preferably by welding, to one of the hook-like projections 26 carried at the lower end of one of the bottom leaves 23. Chain 37 is of such length as to easily encircle or surround the series of hook-like projections 26 (as in Figures 5 and 6) when the bottom leaves have been raised to closed position by the closing stand prior to introduction into the bucket of the scrap charge.

Figure 7:
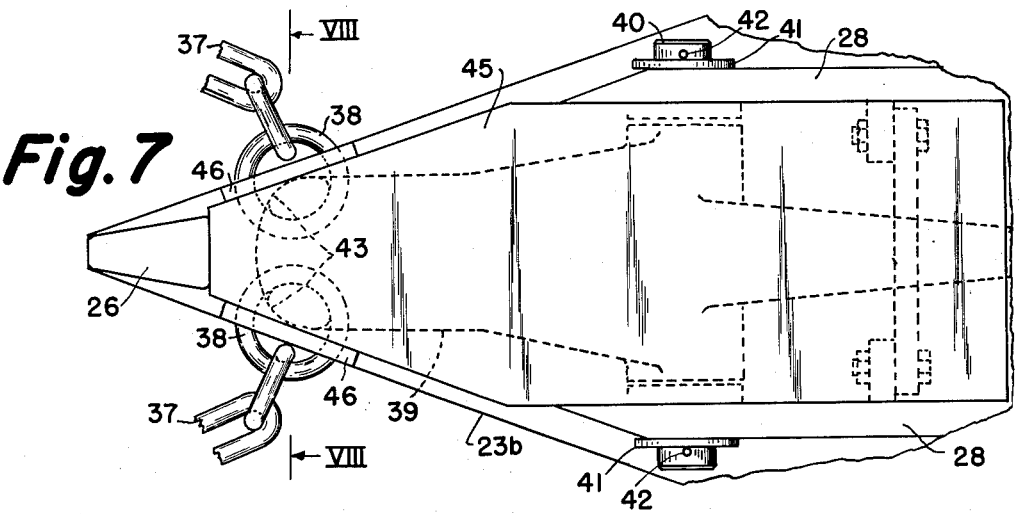
Fig. 7 is a bottom plan view on a greatly enlarged scale of part of the device of Fig. 4 and shows the locking chain in locking position.
Figure 8:
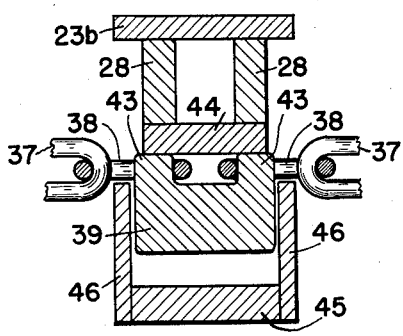
Fig. 8 is a sectional view taken on line VIII—VIII of Fig. 7.

The means or mechanism for locking the chain in projection 26 encircling position is carried by the bottom leaf 23b located diametrically opposite the leaf to which the center of the chain is secured. This chain locking means or mechanism comprises a lever 39 which is journaled on a pin 40 passing through aligned openings in the longitudinal stiffening ribs 28 (Fig. 7) of the leaf. Pin 40, beyond such stiffening ribs is provided with washers 41 and cotter pins 42. Lever 39 at its lower end is provided with two chain engaging fingers 43—described as pin-like—which project toward leaf 23b.

Projections 43, when lever 39 is manually moved to chain locking position, contact a stop plate 44 carried by the lower end portions of longitudinal ribs 28. End portion 39a of lever 39 (the end opposite chain-like projections 43) serves as a handle by means of which lever 39 can be manually swung to chain locking position, the position shown in Figs. 4 to 8 inclusive.

Figure 9:
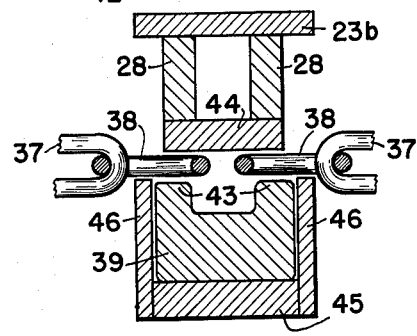
Fig. 9 is a view similar to Fig 8 which shows the chain locking device in unlocked position as it appears in Fig. 2.

A guard or cover plate 45 is welded in place on the lower ends of ribs 28 after lever 39 is mounted on pin 40. Welded to opposite sides of this guard or cover plate in line with chain engaging projections 43 are two chain knock-out plates 46. These knock-out plates project slightly beyond the outer ends of chain engaging fingers 43 when the lower end of lever 39 is located at the limit of its movement away from bottom leaf 23b so that as lever 39 is moved to the position shown in Figure 9, end rings 38 of the chain 37 will be forcibly released or knocked out of engagement with fingers 43.

Figure 4:
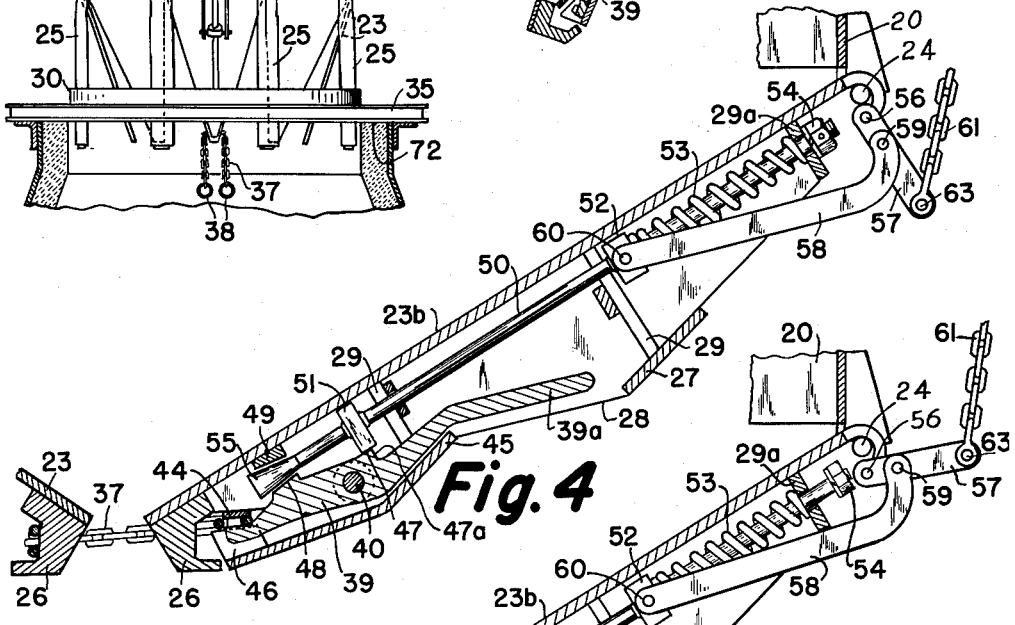
Fig. 4 is a view similar to Fig. 3 and shows the locking chain in locking position.

Lever 39 on the handle side of pin 40 is provided with a shoulder 47 and on the chain-engaging side of pin 40 with a cam surface 48. Secured against the outer face of bottom leaf 23b in line with cam face 48 is a cam block 49. A rod 50 mounted for reciprocation through openings in transverse stiffening ribs 29 of leaf 23b is provided with a rectangular block 51 for cooperation with shoulder 47 in holding lever 39 in chain-locking position (Fig. 4).

Rod 50 is provided with a spring abutment member 52 and between such member and the upper transverse rib which I have numbered 29a, rod 50 is surrounded by a helical compression spring 53. The upper end of rod 50 above rib 29a is provided with screw threads which carry an adjustment nut 54. The lower end of rod 50 is provided with an upwardly tapered wedge member 55 which operates between cam surface 48 and cam block 49.

Pivotally connected, as at 56, to an upper end portion of leaf 23b adjacent its pivotal connection to the lower edge of the bucket body as at 24 is a lever arm 57, and a link 58 pivotally connected to such lever arm at 59, has its lower end pivotally connected, as at 60, to spring abutment member 52.

Figure 10:
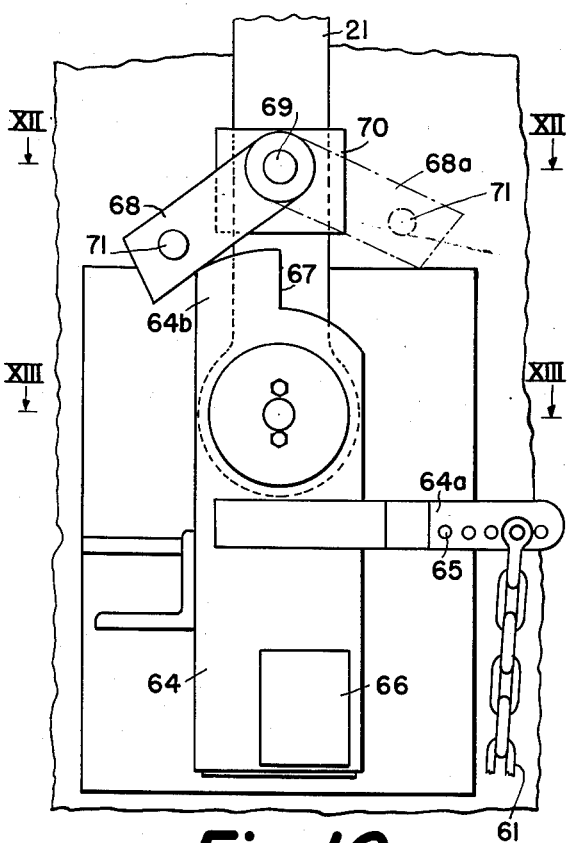
Fig. 10 is a fragmentary view in elevation of the chain lock releasing mechanism of this invention.

A chain 61 provided with an adjustment turnbuckle 62 is connected to the outer end of lever 57 as at 63. The opposite or upper end of chain 61 is connected to a bell crank lever 64. Lever 64 is mounted on an extension of bucket trunnion 22. Arm 64a of lever 64 to which chain 61 is attached is provided with a series of holes 65 so that its effective length can be varied or adjusted. Well below its pivot point, lever 64 is provided with a counterweight 66 which, when chain 61 is slack, will tend to hold arm 64b of lever 64 in upright position as in Figure 10.

This arm 64b is provided with a shoulder 67 which is adapted to be engaged by a dog 68 pivoted as at 69 to a carrier member 70 secured to the bucket bail 21. Dog 68 is provided with a handle 71 by means of which it may be moved from inoperative position shown by dot and dash lines, Fig. 10, to operative position shown by full lines in said figure.

Operation

Figure 2:
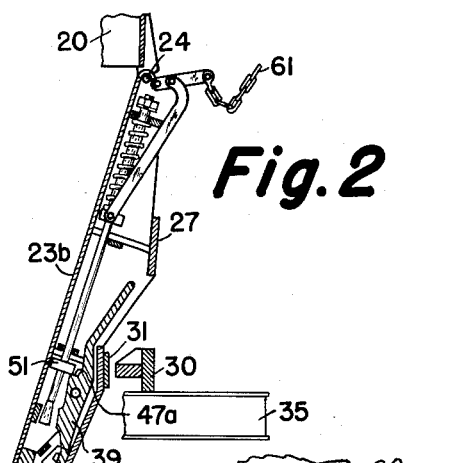
Fig 2 is a view on an enlarged scale partly in section and partly in elevation of that portion of the locking device of this invention which is carried by one of the bottom leaves of the bucket.

The bucket of this invention after its load of scrap is discharged through the furnace charging opening, is carried by the overhead crane to the closing stand and by such crane, is lowered onto the stand whereby the bottom leaves 23 are forcibly swung up to closed position. Chain 37 is then wrapped around projections 36 and the rings 38 are placed over pin-like projections 43 of lever 39. As soon as both rings 38 are in position on these pin-like projections, handle 39a of lever 39 is pulled down so that projections 43 are moved up into contact with plate 44. Pulling handle 39a down releases locking block 51 which has been held in contact with face 47a of shoulder 47 by spring 53, as shown in Fig. 2. As soon as handle 39a is pulled down, block 51 is moved by spring 53 to the position shown in Fig. 4. This locks chain 37 in bottom leaf locking position in which position it is held until it is released to drop the scrap load.

With the bottom leaves 23 and 23b locked in closed position, the bucket may be lifted off the closing stand by the overhead crane and moved to the scrap loading area and placed either on the floor of the loading area or on the buggy or car by which it is to be moved to a position adjacent the furnace to be charged. After being loaded with scrap, it may be carried directly by the overhead crane to the furnace charging opening or may be set aside until the furnace is ready to receive more scrap.

Figure 1:
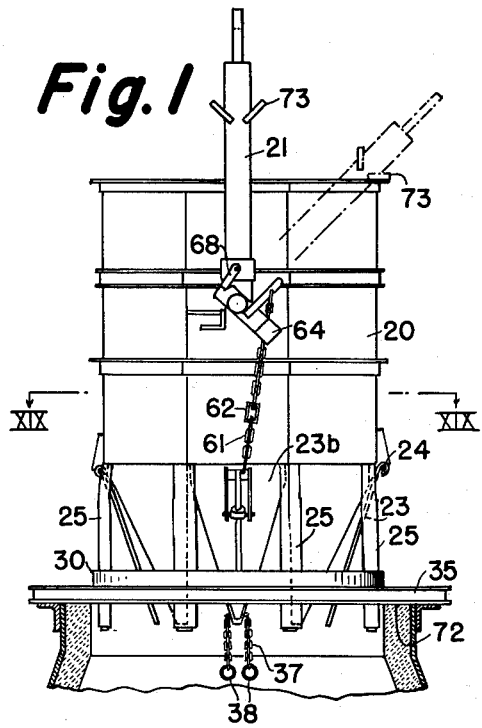
Figure 1 is an elevational view of a scrap charging bucket embodying this invention. This view shows the bucket resting on the rim of the furnace charging opening immediately after the bottom locking device of this invention has been released and the scrap load has been discharged.
Figure 3:
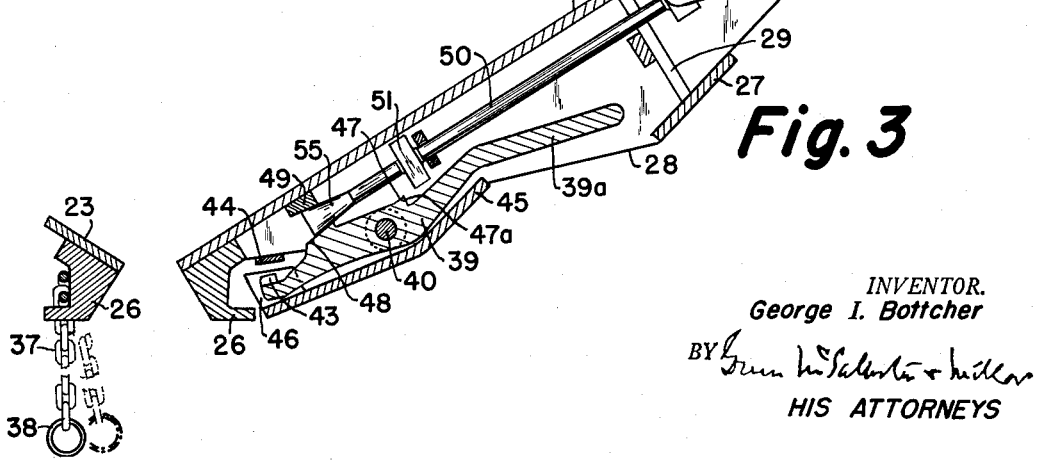
Fig. 3 is a view partially in section and partially in elevation on a greatly enlarged scale of the leaf and locking device of Fig. 2 as it appears the instant the locking chain has been released and before the leaf drops to the position shown in Fig. 2.
Figure 15:
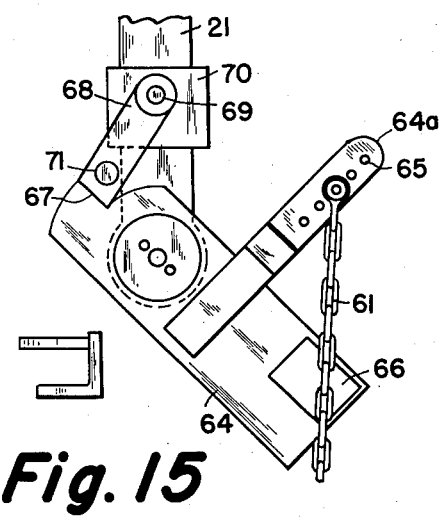
Fig. 15 is a view similar to Fig. 14 with the bail in raised position and the release lever in the position in which the chain will move the chain locking device to the position shown in Fig. 3 just before the bottom leaf carrying the locking mechanism falls to the position shown in Fig. 2.
Figure 14:
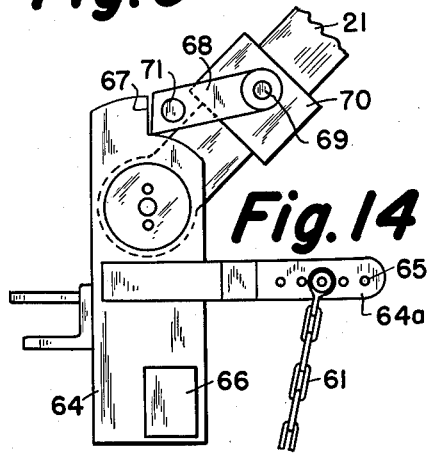
Fig. 14 is a view similar to Fig. 10 on a reduced scale and shows the bail in down position with the release dog engaging the release lever.

In any event, when the scrap in the loaded bucket is to be deposited through the furnace charging opening, the bucket by means of an overhead crane is moved to position over the charging opening and lowered until its support frame 35 secured to its post-like legs 25 rests on the rim 72 of the furnace charging opening as in Figure 1. Dog 68 (which has been previously moved to inoperative position 68a) is moved from inoperative to operative position, the position shown by full lines in Figure 10, and the bail 21 is immediately lowered to the right side so that stop lugs 73 on the bail 21 contact with the upper rim of the bucket (see Figure 1). The bail is then immediately lifted to vertical position. This causes dog 68 to contact shoulder 67 and swing lever 64 to the position shown in Figure 15. This brings lever 57 up into the position shown in Figure 3. Movement of lever 57 up to this position causes link 58 to raise rod 50, causing wedge member 55 to move lever 39 to chain releasing position, the position shown in Figure 3.

Immediately upon the release of chain 37, leaves 23 will be opened by the load of scrap which they have been supporting, and this load will avalanche into the furnace through the charging opening. The violent movement of the bottom leaves 23 from closed to open position is cushioned by springs 31.

What I claim is:

1. A bucket for discharging scrap downwardly through a furnace charging opening, comprising a bucket body having a lifting bail pivotally connected to trunnions projecting outwardly from opposite sides thereof, a bottom comprising multiple downwardly tapered leaves hingedly connected to the bucket body adjacent its lower edge and each, adjacent its lower end, having an outwardly extending hook-like projection; post-like legs extending downwardly from the bucket body and being of such length as to support the bucket a sufficient distance above a support floor or platform to permit such bottom leaves to be swung to and from closed position; in combination with stop means secured to such post-like legs for supporting the bucket on the rim of a furnace charging opening, a chain having pin-engaging members at opposite ends thereof and which, substantially midway between its ends, is secured to the hook-like projection on one of the bucket bottom leaves, a pivoted lever carried by the bucket bottom leaf diametrically opposite the leaf to which such chain is secured, such lever adjacent one end being equipped with a pair of pin-like elements adapted to receive the pin-engaging members at the ends of such chain when such chain is so manipulated manually as to surround the hook-like projections when the bucket is empty and its bottom leaves have been swung to and supported in closed position, such lever at its end remote from such pin-like elements having a handle portion by means of which it can be manually moved to chain-locking position, spring urged means for locking such lever in chain-locking position, and means operated by the bucket bail when being moved from its down position to its upright position for moving such chain lock from chain-locking position to chain-releasing position; the bucket with its charge of scrap being supported on the rim of the furnace charging opening by the stop means on its post-like legs.

2. A structure as defined in claim 1 in which the pin-engaging members at opposite ends of the chain take the form of rings.

3. A structure as defined in claim 1, in which the end of the lever equipped with the pin-like elements operates between a pair of chain knock-out plates.

4. A structure as defined in claim 1, in which the chain lock releasing means operated by the bucket bail comprises a pivoted lever operatively associated with said bucket body for pivotal movement with respect to the bucket, said last-mentioned pivoted lever having its pivotal axis coinciding with the pivotal axis of the bail, and a flexible connection between such lever and the spring urged means for locking the manually moved chain locking lever.

5. A structure as defined in claim 4 in which the flexible connection referred to therein takes the form of a chain.

6. A structure as defined in claim 4, in which the flexible connection referred to therein takes the form of a chain having a turn-buckle adjustment.

7. A structure as defined in claim 1, in which the means operated by the bucket bail when being moved from down to upright position includes a pivoted lever pivotally connected to said bucket body, a flexible connection between such lever and the spring urged chain locking means, and a dog pivotally mounted on the bucket bail for operating such lever and which must be moved manually from inoperative to operative position just prior to movement of the bail from down position to the upright position which is intended to release the chain-locking mechanism.

8. A mechanism for locking and releasing multiple leaves which form the bottom of a bucket for discharging scrap downwardly through a furnace opening and which bucket has a locking chain for surrounding the lower ends of the leaves when they are in a closed position, and wherein a lifting bail is pivotally connected to trunnions projecting from opposite sides of the bucket for movement between down and upright positions, which mechanism comprises a pivoted lever carried by one bottom leaf of the bucket, said pivoted lever having at one end thereof at least one pin-like element adapted to releasably hold the chain in position around the leaves when the leaves are in their closed position, said pivoted lever having a handle portion at its opposite end for manual movement to a chain locking position, a stop means mounted on said bottom leaf and cooperating with said pivoted lever for locking said lever in its chain-locking position, and means operated by the lifting bail when the bail is moved from its down position to its upright position for moving said stop means from a lever locking position to a lever releasing position.

9. A mechanism for locking and releasing multiple leaves which form the bottom of a bucket for discharging scrap downwardly through a furnace opening and which bucket has a locking chain for surrounding the lower ends of the leaves when they are in a closed relation, and wherein a lifting bail is pivotally connected to trunnions projecting from opposite sides of the bucket for movement between down and upright positions which mechanism comprises, a latching lever operatively carried by a bottom leaf of the bucket, said latching lever having a projecting latch portion to releasably latch-engage the chain and hold it in position around the leaves when they are in a closed relation, locking means operatively mounted on said bottom leaf and engaging said latching lever for locking it in its chain-engaging position, means operatively connecting the bail with said locking means and having cooperating elements operated by the bail when it is moved from its down to its upright position to actuate said locking means and move said latching means from its chain-engaging to a chain-releasing position.

10. A mechanism as defined in claim 9 wherein, spring means cooperates with said locking means to urge it towards its locking position with respect to said latch lever.

11. A mechanism as defined in claim 9 wherein, said locking means has a stop portion to engage said latching lever and positively hold it in its chain-engaging position and has portions to simultaneously move said stop portion out of engagement with said latching lever and positively move said lever out of latching engagement with the chain.

12. A mechanism as defined in claim 11 wherein, the operative connection between the bail and said locking means comprises a bell-crank lever and a cooperating dog, and said dog has means for moving it out of engagement with said bell-crank lever when the bail is to be moved without actuating said locking means.

References Cited in the file of this patent
UNITED STATES PATENTS

| | | |
|---|---|---|
| 991,321 | Kerr | May 2, 1911 |
| 1,325,638 | Healey | Dec. 23, 1919 |
| 1,902,863 | Kersting | Mar. 28, 1933 |
| 2,350,611 | Hicks | June 6, 1944 |
| 2,387,457 | McIlwrick et al. | Oct. 23, 1945 |
| 2,626,828 | Morgan | Jan. 27, 1953 |
| 2,678,230 | Consoldane et al. | May 11, 1954 |